United States Patent Office 2,819,319
Patented Jan. 7, 1958

2,819,319

PRODUCTION OF ALCOHOLS BY HYDROLYSIS OF ALKYL BROMIDES

David K. Barnes, Kinston, N. C., assignor to Pan American Petroleum Corporation, a corporation of Delaware No Drawing. Application August 13, 1954
Serial No. 449,779

5 Claims. (Cl. 260—640)

The present invention relates to a novel method for the preparation of alcohols from their corresponding alkyl halides. More particularly, it is concerned with a method for the preparation of secondary and primary alcohols from analogous alkyl halides involving direct hydrolysis of the latter.

It is known that tertiary alkyl halides react very rapidly at atmospheric temperature and pressure with water to form the corresponding tertiary alcohol and halogen acid. However, under similar conditions, secondary and primary alkyl halides are not hydrolyzed by water to any appreciable degree. In fact, this method is frequently employed as a test for tertiary alkyl halides. To secure substantial direct hydrolysis of a secondary or primary alkyl halide, it is generally necessary to heat it in a sealed bomb for several days at temperatures of the order of 100° C. in the presence of water. The rate of hydrolysis occurring under such circumstances is proportional to the hydroxyl ion concentration. Accordingly, the addition of alkali to the system has a beneficial effect. Frequently, the hydroxyl group is substituted for the halide by the use of silver hydroxide causing the corresponding silver halide to precipitate. Also, alkali metal hydroxides are sometimes employed to effect the desired hydrolysis. However, recovery of the halogen in the form of its acid from the salts produced either by the use of silver hydroxide or from the alkali metal hydroxides is difficult. Direct hydrolysis of the alkyl halide by the use of water has the advantage of allowing easy recovery of the halogen acid produced, but, as pointed out above, usually suffers from the disadvantages that the reaction rate decreases rapidly as the acid is formed.

Contrary to the previous difficulties experienced with the direct hydrolysis of secondary and primary alkyl halides, I have discovered that such reaction may be readily effected without the accompanying disadvantages encountered in former methods. Thus, in accordance with the process of my invention, the secondary or primary alkyl halide is placed in a pressure vessel together with water, preferably in molar excess. Thereafter, I introduce a suitable olefin in an amount sufficient to create a pressure of from about 300 to about 1000 p. s. i. at temperatures ranging from about 90° to about 300° C. The olefin employed may have the same carbon content as the alkyl halide being hydrolyzed: it may, however, contain more or fewer carbon atoms. While it is not necessarily essential to the practice of my invention, it may frequently be desirable to employ from about 0.1 to about 1.0 weight percent of a surface-active agent, preferably of the non-ionic type. Completion of the reaction is generally evidenced by lack of further pressure drop within the reaction vessel. Under the above-described conditions, the halogen acid liberated as a result of the hydrolysis reacts with the olefin present to form an alkyl halide which is likewise subject to hydrolysis. This also serves to maintain a relatively constant hydroxyl ion concentration.

In effecting this direct hydrolysis of the alkyl halide in accordance with my invention, the usual type of apparatus for conducting reactions at super atmospheric pressures may be employed. For example, I may employ pressure autoclaves fitted with suitable agitating devices or reaction vessels of the "rocking bomb" type described in Reactions of Hydrogen Over Nickel and Chromium Oxides, by Homer Adkins, University of Wisconsin Press, 1937. It is to be definitely understood, however, that my invention is not limited in any way to the type of apparatus or to any particular mechanical details involved in carrying out the reaction.

The olefin utilized in carrying out the process of my invention may be any of the class to which a halogen acid can be added under the conditions of the involved reaction. Obviously, this means that a very large class of olefins is suitable for my purpose. As examples of such compounds, there may be mentioned ethylene, butenes, pentenes, styrene, and the like. The aforesaid compounds and their homologs may contain in their nuclei one or more halogen atoms or other negative groups attached to saturated or unsaturated carbon atoms, such as for example, vinyl acetate, the vinyl halides, allyl alcohol, allyl halides, methallyl halides, and the like. In view of the similarity in the behavior of the various substituted olefins or unsaturated compounds mentioned above to the true olefins in the process of my invention, it is to be strictly understood that the term "olefin," as used in the present description and accompanying claims, is intended to include both substituted and unsubstituted olefins.

Also, it will be apparent that by the use of my invention two alcohols are simultaneously produced. These alcohols may have the same or different carbon content but, at most, only one of them will be the primary alcohol, unless, of course, ethylene is used as the olefin. When ethylene is not employed as the olefin in the process of my invention the other alcohol, being derived from the olefin via the formation of the halogen acid addition product and subsequent hydrolysis of the latter, of necessity, is a secondary alcohol. Starting with a secondary alkyl halide and hydrolyzing the latter in the presence of an olefin, it is possible to obtain either a single secondary alcohol, two different secondary alcohols, or two primary alcohols, depending, of course, on the olefin employed.

Any of a wide variety of surface-active agents may be used; however, in general, I prefer to use the non-ionic surface-active agents, such as for example, aromatic polyglycol ethers, alkyl aryl polyethylene glycols, long chain fatty acid esters containing multiple ether linkages, polyoxyethylene esters, polyoxyethylene thioethers, alkyl aryl polyether alcohols, polyoxyethylene sorbitan monooleate, polyoxylethylene mixed esters of fatty and resin acids, etc.

My invention may be further illustrated by the following specific example.

EXAMPLE

Into a high-pressure glass-lined reactor of the "rocking bomb" type was introduced 0.25 mol of 1-propyl bromide and 10 mols of water. In certain of the runs noted below, a surface-active agent (Aerosol OT-dioctyl sodium sulfosuccinate) was added to the reaction mixture at this point at the concentrations indicated. The bomb was then sealed and in the single run in which propylene was injected into the reaction zone, the gas was introduced by connecting a propylene charge bomb to the reactor and thereafter heating the charge bomb in a water bath in order to force propylene in the desired amount into the reaction vessel. In this manner, propylene was introduced so as to maintain throughout the reaction a pressure of from about 400 to 500 p. s. i. In the other two runs, the reaction was carried out under autogeneous pressure. All runs were made at about 100° C. and were approximately 8 hours in duration.

*Table I*

| Surface-Active Agent, percent | Propylene, Pressure, p. s. i. | Products, mol percent | |
|---|---|---|---|
| | | 1-Propanol | 2-Propanol[1] |
| None | None | 25 | 0 |
| 0.25 | None | 27 | 0 |
| 0.10 | 400–500 | 33 | 9 |

[1] Produced from the olefin.

From the foregoing example, it will be seen that under the conditions provided by the present invention a substantial improvement in yield of primary alcohol by direct hydrolysis of the corresponding 1-alkyl halide can be realized. Also, it is to be noted that the secondary alcohol derived from the 1-olefin present is simultaneously produced in an appreciable amount.

I claim:

1. In a process for the hydrolysis of an alkyl bromide selected from the group consisting of primary and secondary alkyl bromides to produce the corresponding alcohol and the corresponding hydrogen halide, the steps which comprise subjecting said alkyl bromide to direct hydrolysis in water in the presence of an olefin at a temperature ranging from about 90° to about 300° C. and at an olefin pressure of from about 300 to about 1000 p. s. i., said olefin being gaseous under the aforesaid conditions of temperature and pressure, the only bromide present in the reaction mixture other than said alkyl bromide being that derived from the hydrolysis of said alkyl bromide, and recovering a reaction mixture containing the alcohol derived from said alkyl bromide.

2. The process of claim 1 in which a surface-active agent is employed in the reaction mixture in a concentration of from about 0.1 to about 1.0 weight percent.

3. In a process for the hydrolysis of a primary alkyl bromide to produce the corresponding alcohol and the corresponding hydrogen bromide, the steps which comprise subjecting said alkyl bromide to direct hydrolysis in water containing from about 0.1 to about 1.0 weight percent of a surface active agent in the presence of an olefin at a temperature ranging from about 90° to about 300° C. and at an olefin pressure of from about 300 to about 1000 p. s. i., said olefin being gaseous under the aforesaid conditions of temperature and pressure, the only bromide present in the reaction mixture other than said alkyl bromide being that derived from the hydrolysis of said alkyl bromide, and recovering a reaction mixture containing the alcohol derived from said alkyl bromide.

4. The process of claim 3 in which the carbon content of the olefin employed in different from that of the primary alkyl bromide.

5. In a process for the hydrolysis of n-propyl bromide to produce n-propyl alcohol, the steps which comprise subjecting said n-propyl bromide to direct hydrolysis in water containing from about 0.1 to about 1.0 weight percent of a surface-active agent in the presence of propylene at a temperature of about 100° C., and at a pressure of from about 400 to 500 p. s. i., and recovering a reaction mixture containing n-propyl alcohol.

References Cited in the file of this patent

UNITED STATES PATENTS

| 1,691,426 | Ayres et al. | Nov. 13, 1928 |
| 2,313,767 | Pollack et al. | Mar. 16, 1943 |
| 2,457,882 | Frey | Jan. 4, 1949 |
| 2,583,413 | Carnell | Jan. 22, 1952 |

OTHER REFERENCES

Lucas et al.: "Principles and Practice in Organic Chemistry," Wiley & Sons, N. Y., 1949; pp. 170–3, 209.

Fieser et al.: "Organic Chemistry," 2d edit.: 1950, Heath, N. Y.; p. 63.

Noller: "Chemistry of Organic Compounds," W. B. Saunders, Phila., 1951; pp. 51, 114–21.

Gilman: "Organic Chemistry," vol. III, Wiley & Sons, N. Y., 1953; pp. 49, 50.